(12) United States Patent
Li et al.

(10) Patent No.: US 10,175,412 B2
(45) Date of Patent: Jan. 8, 2019

(54) LIGHT GUIDE PLATE, BACKLIGHT MODULE AND WEARABLE DEVICE

(71) Applicants: BOE TECHNOLOGY GROUP CO., LTD., Beijing (CN); BEIJING BOE CHATANI ELECTRONICS CO., LTD., Beijing (CN)

(72) Inventors: Jinze Li, Beijing (CN); Zhendong Zhou, Beijing (CN); Dongsheng Yang, Beijing (CN)

(73) Assignees: BOE TECHNOLOGY GROUP CO., LTD. (CN); BEIJING BOE CHATANI ELECTRONICS CO., LTD. (CN)

( * ) Notice: Subject to any disclaimer, the term of this patent is extended or adjusted under 35 U.S.C. 154(b) by 243 days.

(21) Appl. No.: 15/309,137

(22) PCT Filed: Jan. 22, 2016

(86) PCT No.: PCT/CN2016/071770
§ 371 (c)(1),
(2) Date: Nov. 4, 2016

(87) PCT Pub. No.: WO2017/054375
PCT Pub. Date: Apr. 6, 2017

(65) Prior Publication Data
US 2017/0293068 A1    Oct. 12, 2017

(30) Foreign Application Priority Data

Sep. 29, 2015    (CN) .................... 2015 2 0762317 U

(51) Int. Cl.
*F21V 8/00*    (2006.01)
*G02B 6/00*    (2006.01)

(52) U.S. Cl.
CPC ............. *G02B 6/0036* (2013.01); *G02B 6/00* (2013.01); *G02B 6/002* (2013.01); *G02B 6/0055* (2013.01)

(58) Field of Classification Search
CPC ...... G02B 6/0036; G02B 6/00; G02B 6/0055; G02B 6/002
(Continued)

(56) References Cited

U.S. PATENT DOCUMENTS

2010/0196685 A1* 8/2010 Murata ............... C03C 17/3435
428/216

FOREIGN PATENT DOCUMENTS

CN    1782754 A    6/2006
CN    101103320 A    1/2008
(Continued)

OTHER PUBLICATIONS

International Search Report and Written Opinion for Application No. PCT/CN2016/071770, dated Jun. 27, 2016, 14 Pages.

*Primary Examiner* — Bao Q Truong
*Assistant Examiner* — Hana Featherly
(74) *Attorney, Agent, or Firm* — Brooks Kushman P.C.

(57) ABSTRACT

According the embodiments of the present disclosure, the light guide plate includes a light guide plate body having an upper surface as a light-exiting surface. The light guide plate is provided at a side portion at least one notch, and a light-reflection layer is arranged at a surface of each notch. A wedge-shaped structure is arranged on a lower surface of the light guide plate body and adjacent to a bottom of each notch. The wedge-shaped structure has a first surface attached onto the lower surface of the light guide plate body, a second surface serving as a light-entering surface, and a third surface intersecting the first surface and the second surface and forming an acute angle relative to the first
(Continued)

surface. A light-reflection layer is arranged on the third surface. A light source is arranged at a position on the lower surface of the light guide plate body adjacent to the second surface of the wedge-shaped structure.

20 Claims, 2 Drawing Sheets

(58) Field of Classification Search
USPC .......................................................... 362/606
See application file for complete search history.

(56) References Cited

FOREIGN PATENT DOCUMENTS

| | | |
|---|---|---|
| CN | 201037875 Y | 3/2008 |
| CN | 103048726 A | 4/2013 |
| CN | 104832884 A | 8/2015 |
| CN | 204945422 U | 1/2016 |
| JP | H0996682 A | 4/1997 |
| JP | 2000137218 A | 5/2000 |
| JP | 2006029896 A | 2/2006 |

* cited by examiner

LIGHT GUIDE PLATE, BACKLIGHT MODULE AND WEARABLE DEVICE

CROSS-REFERENCE TO RELATED APPLICATIONS

This application is the U.S. national phase of PCT Application No. PCT/CN2016/071770 filed on Jan. 22, 2016, which claims priority to Chinese Patent Application No. 201520762317.9 filed on Sep. 29, 2015, the disclosures of which are incorporated in their entirety by reference herein.

TECHNICAL FIELD

The present disclosure relates to the field of display technology, in particular to a light guide plate, a backlight module and a wearable device.

BACKGROUND

Currently, smart wearable devices, especially smart watches, have developed rapidly. For the smart watch with a circular or near-circular dial, it is necessary to provide a circular or near-circular backlight source, especially a circular or near-circular light guide plate in the backlight source.

For example, for the design of the circular or near-circular light guide plate, essentially a direct-type or edge-type backlight source structure is adopted. Of course, during the design of the light guide plate having any other shapes, the direct-type or edge-type backlight source structure may also be adopted in accordance with the practical need.

In the case of the direct-type backlight source structure, the light guide plate needs to occupy a large space, so it is impossible to meet the requirements on the mass production of small-size and super-thin products. In the case of the edge-type backlight source structure, light-emitting diodes (LEDs), serving as the backlight source, each has a flat light-emitting surface, while a lateral surface of the circular light guide plate is round. Hence, light loss may easily occur for the LED light source due to the circular light guide plate, and it is difficult to assemble the light guide plate with the backlight source.

SUMMARY (1) Technical Problem to be Solved

A main object of the present disclosure is to provide a novel guide plate, so as to reduce the space occupied by the light guide plate in the case of the direct-type backlight source structure, and prevent the light loss and facilitate the assembly of the light guide plate with the backlight source in the case of the edge-type backlight source structure.

(2) Technical Solution

In one aspect, the present disclosure provides in some embodiments a light guide plate, including a light guide plate body having an upper surface as a light-exiting surface. The light guide plate is provided at a side portion at least one notch, and a light-reflection layer is arranged at a surface of each notch. A wedge-shaped structure is arranged on a lower surface of the light guide plate body and adjacent to a bottom of each notch. The wedge-shaped structure has a first surface attached onto the lower surface of the light guide plate body, a second surface serving as a light-entering surface, and a third surface intersecting the first surface and the second surface and having an acute angle relative to the first surface. A light-reflection layer is arranged on the third surface. A light source is arranged at a position on the lower surface of the light guide plate body and adjacent to the second surface of the wedge-shaped structure. A light beam from the light source passes through the light-entering surface and reaches the third surface of the wedge-shaped structure and the notch, so that the light beam is reflected by the light-reflection layer at the third surface and the light-reflection layer at the notch toward the light guide plate body.

In one possible embodiment, the notch is of an arc shape, and a surface of the notch is a cylindrical surface having a predetermined radian.

In one possible embodiment, the third surface completely intersects an edge of the notch.

In one possible embodiment, the third surface is defined by a curved side intersecting the edge of the notch, a straight side opposite to the curved side, and two lateral sides intersecting the straight side and the curved side respectively, and the two lateral sides and the straight side form two lateral sides and an upper base of an isosceles trapezoid.

In one possible embodiment, the two lateral sides form an angle having a range of 0~120°.

In one possible embodiment, the light-reflection layer at the surface of the notch is formed integrally with the light-reflection layer at the third surface.

In one possible embodiment, the light guide plate body is formed integrally with the wedge-shaped structure.

In one possible embodiment, the wedge-shaped structure has a height greater than or equal to the light source.

In one possible embodiment, a tangential surface to the cylindrical surface is substantially parallel to the second surface of the wedge-shaped structure.

In one possible embodiment, the light-exiting surface is of a circular or near-circular shape.

In another aspect, the present disclosure provides in some embodiments a backlight module including the above-mentioned light guide plate, and a backlight source arranged on the backlight source.

In one possible embodiment, the backlight source includes a flat light-emitting surface attached onto the light-entering surface of the wedge-shaped structure.

In yet another aspect, the present disclosure provides in some embodiments a wearable device including the above-mentioned backlight module.

(3) Beneficial Effect

According to the light guide plate, the backlight module and the wearable device in the embodiments of the present disclosure, through the improvement on an internal structure of the light guide plate, it is able to reduce the space occupied by the light guide plate in the backlight module. In addition, an arc reflection member is arranged on the light guide plate so as to reflect the light beam from the backlight source, it is able to reduce the light loss of the backlight source to the greatest extent. Further, the arc reflection member has a flat surface where a planar backlight source is located, so it is able to facilitate the assembly of the planar backlight source with a circular light guide plate.

BRIEF DESCRIPTION OF THE DRAWINGS

In order to illustrate the technical solutions in the embodiments of the present disclosure or the related art in a clearer manner, the drawings desired for the present disclosure or the related art will be described briefly hereinafter. Obviously, the following drawings merely relate to parts of the embodiments of the present disclosure, and a person skilled in the art may, without any creative effort, acquire the other drawings based on these drawings.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

For the design of a circular light guide plate in the related art, usually direct-type and edge-type backlight sources are adopted. However, in the case of the direct-type backlight source, the light guide plate may occupy a large space. In addition, in the case of the edge-type backlight source (e.g., LEDs), it has a substantially flat light-emitting surface while the light guide plate has a rounded edge, so it is difficult to assemble it with the light guide plate, and meanwhile its light utilization rate is very low.

In order to overcome the above-mentioned defects, the present disclosure provides a novel light guide plate, especially a novel circular light guide plate, and a backlight module. Through the improvement on an internal structure of the light guide plate at a light-entering side, it is able to improve the light utilization rate, facilitate the assembly of a backlight source with the light guide plate, and reduce the space occupied by the light guide plate, thereby to enable the backlight source for a wearable device such as a smart watch to emit light in a circular manner.

The present disclosure will be described hereinafter in conjunction with the drawings and the embodiments.

Figure 1:
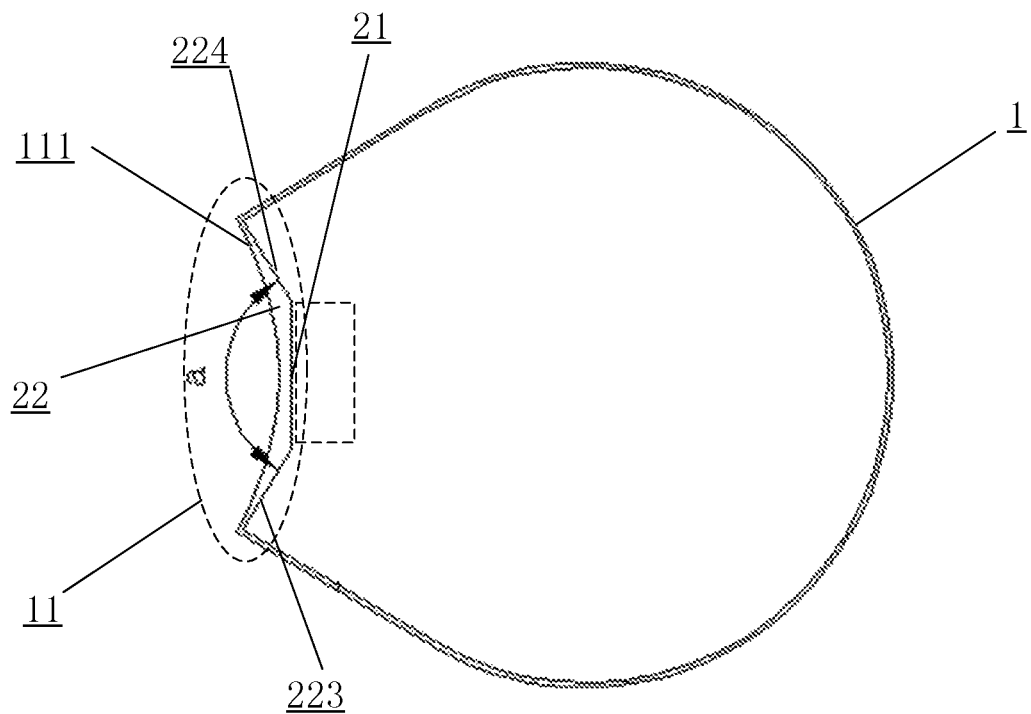
FIG. 1 is a top view of a light guide plate according to one embodiment of the present disclosure.
Figure 2:
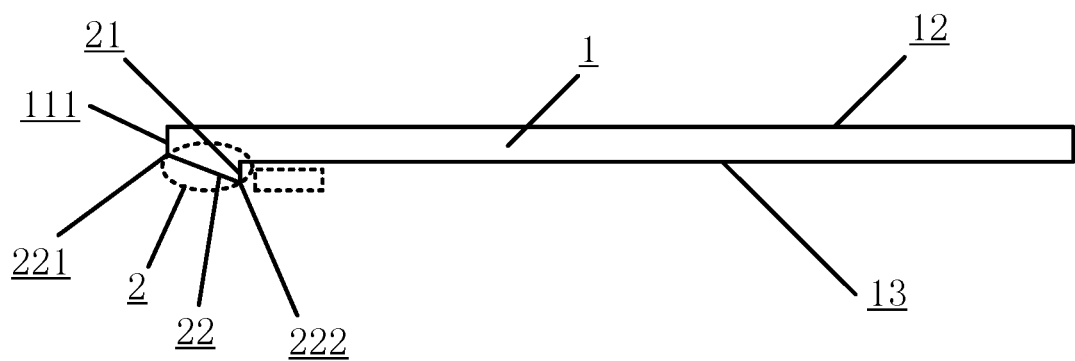
FIG. 2 is a front view of the light guide plate according to one embodiment of the present disclosure.

As shown in FIG. 1, which is a top view of a light guide plate according to one embodiment of the present disclosure, and as shown in FIG. 2, which is a front view of the light guide plate according to one embodiment of the present disclosure, the light guide plate includes a light guide plate body 1 having an upper surface 12 as a circular or near-circular light-exiting surface. In other words, the light guide plate body 1 is of a cylindrical shape as a whole, and it has a circular or near-circular (e.g., elliptical or the like) cross section.

The light guide plate 1 is provided at a side portion at least one notch 11 (represented by a dotted oval in FIG. 1), and a light-reflection layer is arranged at a surface of each notch 11. In other words, at least one recess connecting the upper surface and a lower surface of the light guide plate body is arranged at an end of the cylindrical light guide plate body 1. During the actual application, the number of the notches 11 may be determined in accordance with the practical need, as long as light-emitting effect of the light guide plate is not adversely affected. For example, two notches 11 may be arranged in the light guide plate symmetrically with each other relative to a central axis of the light guide plate, i.e., at an interval of a radian of 180°. In one possible embodiment, four notches 11 may also be arranged at an interval of a radian of 90°.

In the embodiments of the present disclosure, the upper surface 12 of the light guide plate body 1 serves as the light-exiting surface, and the lower surface 13 is an opposite surface to the light-exiting surface. A spherical convex dot is arranged at a side of the opposite surface of the light guide plate 1 facing the light-exiting surface so as to scatter light beams.

A wedge-shaped structure 2 (represented by a dotted oval in FIG. 2) is arranged on the lower surface 13 of the light guide plate body 1 and adjacent to a bottom of each notch 11. The wedge-shaped structure 2 has a first surface (not shown in FIG. 1, because the light guide plate body 1 is integrally formed with the wedge-shaped structure 2), a second surface 21 and a third surface 22. The first surface is attached onto the lower surface 13 of the light guide plate body 1. The second surface 21 faces a center of the light guide plate, and serves as a light-entering surface. The third surface 22 intersects the first surface and the second surface 22 and has an acute angle relative to the first surface. In other words, the third surface 22 is a surface inclined relative to the opposite surface of the light guide plate body. The third surface 22 faces an edge or a lateral side of the light guide plate body 1 (i.e., it does not face the center of the light guide plate body). In addition, a light-reflection layer is arranged on the third surface 22.

A light source is arranged at a position (represented by dotted rectangles in FIG. 1 and FIG. 2) on the lower surface 13 of the light guide plate body 1 and adjacent to the second surface 21 (i.e., the light-entering surface) of the wedge-shaped structure 2. For example, a light beam from the light source passes through the light-entering surface and reaches the third surface 22 of the wedge-shaped structure 2 and the notch 11, so that the light beam is reflected by the light-reflection layer at the third surface 22 and the light-reflection layer at the notch 11 toward the light guide plate body 1.

In other words, the wedge-shaped structure 2 is arranged adjacent to the notch 11, and extends along a widthwise (perpendicular) direction of the light guide plate body 1 so as to protrude from the opposite surface of the light guide plate body 1 by a predetermined distance. A portion of the wedge-shaped structure 2 protruding from the light guide plate body 1 includes the second surface 21 which serves as the light-entering surface.

In the embodiments of the present disclosure, the notch 11 is of an arc shape (represented by the dotted oval in FIG. 1), and a surface of the notch 11 is a cylindrical surface 111 having a predetermined radian. The third surface 22 completely intersects an edge of the notch. The third surface 22 is defined by a curved side 221 intersecting the edge of the notch, a straight side 222 opposite to the curved side 221, and two lateral sides 223, 224 intersecting the straight side 222 and the curved side 221 respectively. The two lateral sides 223, 224 and the straight side 222 form two lateral sides and an upper base of an isosceles trapezoid. As shown in FIG. 1 and FIG. 2, the third surface 22 is inclined relative to the opposite surface of the light guide plate body 1, and the cylindrical surface 111 is adapted to the surface of the notch 11.

During the actual application, the third surface 22 may be a gently or sharply curved surface. In one possible embodiment, the gently curved surface may be adopted, so as to improve the reflection effect.

In the embodiments of the present disclosure, the two lateral sides 223, 224 form an angle having a range of 0~120°. In one possible embodiment, 30°, 60°, 90° or 120° may be adopted. Of course, they may form any other angles, as long as it is able to achieve the reflection effect.

In the embodiments of the present disclosure, the light-reflection layer at the surface of the notch 11 is formed integrally with the light-reflection layer at the third surface 22. During the actual application, a reflective material may be coated onto the third surface 22 and the cylindrical surface 111, so as to form the light-reflection layers. Also, a reflective film may be directly attached onto the third surface 22 and the cylindrical surface 111. Of course, during the actual application, the light-reflection layers may also be formed through any known methods such as evaporation, which will not be particularly defined herein.

In the embodiments of the present disclosure, the light guide plate body 1 is formed integrally with the wedge-shaped structure 2 (as shown in FIG. 1 and FIG. 2). Of course, during the actual application, the wedge-shaped structure 2 may be formed separately from the light guide plate body 1, and then the first surface of the wedge-shaped structure 2 may be attached onto the lower surface 13 of the light guide plate body 1.

In the embodiments of the present disclosure, the wedge-shaped structure 2 has a height not less than the light source. In this way, the second surface 21 of the wedge-shaped structure 2 may receive all the light beams from the light source, and then the light beams may be reflected by the light reflection layers at the third surface 22 and the cylindrical surface 111 toward an interior of the light guide plate body 1.

In the related art, a thickness of each of LEDs which serve as the edge-type light source is adapted to a thickness of the light guide plate. During the actual application, in the case that the cylindrical surface 111 has a height identical to the thickness of each of the LEDs, it is able for the light guide plate in the embodiments of the present disclosure to be adapted to most of the conventional LEDs.

In the embodiments of the present disclosure, a tangential surface to the cylindrical surface 111 is substantially parallel to the second surface 21 of the wedge-shaped structure 2. In this way, it is able for the cylindrical surface 111 to reflect the light beams passing through the second surface 21 toward the interior of the light guide plate body 1 in a more uniform manner.

In one possible embodiment, a light-exiting direction of the backlight source is perpendicular to the second surface 21, so as to improve the light utilization rate as possible. In the case that the light beam from the backlight source passes through the second surface 21 and reaches the cylindrical surface 111 and the third surface 22, it may be reflected by the light-reflection layers at the cylindrical surface 111 and the third surface 22 toward the light guide plate body 1, and then exit from the light-exiting surface of the light guide plate body 1.

It should be appreciated that, in the embodiments of the present disclosure, the light guide plate is of a circular or near-circular shape. Because this light guide plate has a rounded edge, it is difficult to assemble it with a planar backlight source, and such defects as light leakage may occur. Through providing the backlight source on the flat opposite surface of the light guide plate, it is able to easily attach the backlight source onto the light guide plate in a tight manner, thereby to prevent the occurrence of light leakage.

Further, in order to be adapted to a small-size backlight source, the notch and the wedge-shape structure may be arranged at a lateral surface of the light guide plate body, and the backlight source may emit the light beam toward the notch and the wedge-shaped structure. In this way, the light beam from the backlight source may be reflected by the wedge-shaped structure toward the light guide plate. As a result, it is able for the small-size backlight source to achieve the effect similar to the edge-type backlight source, thereby to reduce the space occupied by the backlight source.

It should be appreciated that, in the embodiments of the present disclosure, the backlight source is arranged on the opposite surface of the light guide plate body and emits the light beam toward the edge of the light guide plate. The light beam from the backlight source may be reflected by the wedge-shaped structure and the cylindrical surface, so it is equivalent to that a virtual backlight source is arranged at a mirror position symmetrical to the backlight source relative to the wedge-shaped structure, i.e., arranged at or adjacent to a lateral surface of the circular or near-circular light guide plate without any notch. In FIG. 1, the dotted rectangle represents the mirror position, i.e., a position at the lateral surface of the circular or near-circular light guide plate without any notch. In this way, it is able for the backlight source on the opposite surface to the light-exiting surface of the light guide plate to achieve an effect similar to the edge-type backlight source, reduce the space occupied by the backlight source, and facilitate the assembly of the backlight source with the circular or near-circular light guide plate.

In one possible embodiment, the second surface 21 has a height greater than or equal to the light source. In this way, it is able to make full use of the light beams from the light source, and protect the edge-type light source such as the LEDs. In addition, in order to save the space to the greatest extent, the height of the second surface 21 may be rightly identical to the height of the light source.

Figure 3:
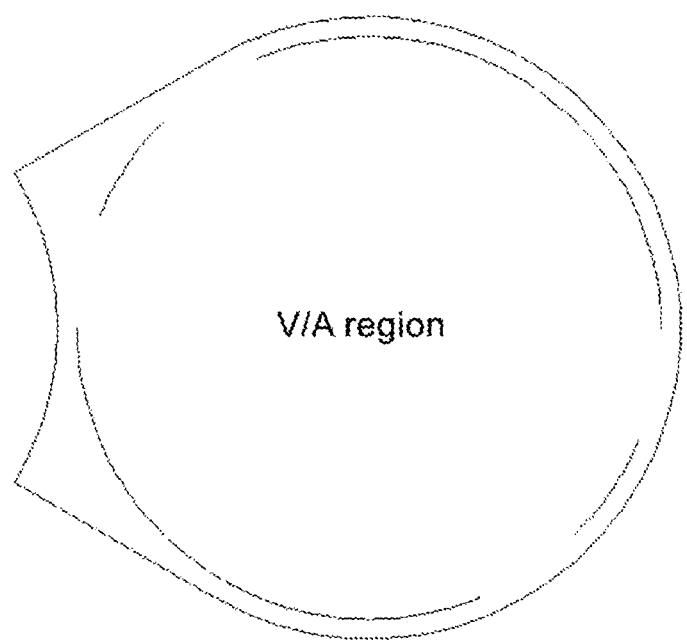
FIG. 3 is a schematic view showing a light-emitting effect of the light guide plate according to one embodiment of the present disclosure.

As shown in FIG. 3, which is a schematic view showing the light-emitting effect of the light guide plate, in which the light beams entering the light guide plate may be scattered and reflected by the surface of the light guide plate where the dots are located, and then distributed uniformly on the entire light-emitting surface.

It can thereof be seen that, during the operation, the light guide plate may emit the light beams in a circular manner. To be specific, firstly, the backlight source (LEDs) may have a flat light-emitting surface, so a portion of the circular light guide plate in contact with the LEDs may also be of a flat surface, so as to utilize the light beams from the LEDs to the greatest extent, and reduce the light loss caused in the related art where the portion of the circular light guide plate in contact with the LEDs is of a convex surface. Secondly, a valid light-emitting angle of the LEDs is 120°, so the angle α between the lateral sides may be less than 120°, so as to utilize the light beams from the LEDs to the greatest extent and reduce the size of the light guide plate. Thirdly, the light-exiting surface and the surface where the dots are located (i.e., the opposite surface) of the light guide plate are not located in a plane identical to a plane where the LEDs are located, so an additional oblique surface is provided, thereby to reflect the light beams from the LED toward the interior of the light guide plate.

Through the light guide plate in the embodiments of the present disclosure, it is able to reflect the light beams from the LEDs directly toward a circular light-emitting region through the reflection layers, and then enable the light beams to uniformly exit from the light-exiting surface through the dots at the circuit light-emitting region.

The light guide plate in the embodiments of the present disclosure may be adapted to the edge-type backlight module, i.e., the light guide plate may be an edge-type light guide plate.

The present disclosure further provides in some embodiments a backlight module including the above-mentioned light guide plate, and the backlight source arranged on the light guide plate.

In one possible embodiment, the backlight source includes a flat light-emitting surface attached onto the light-entering surface of the wedge-shaped structure.

The improvement on the backlight module lies in the improvement on an internal structure of the above-mentioned light guide plate, and thus will not be particularly defined herein.

The present disclosure further provides in some embodiments a wearable device including the above-mentioned backlight module. The improvement on the wearable device lies in the improvement on an internal structure of the above-mentioned light guide plate, and thus will not be particularly defined herein. The wearable device may be, for example, a watch or a bracelet with a dial.

According to the embodiments of the present disclosure, in order to enable the light beams from the backlight source (e.g., the LEDs) to be distributed uniformly within the light guide plate, the convex light reflection layer is provided so as to scatter the light beams. In this way, it is able to make full use of the light beams from the light source.

In addition, through the improvement on an internal structure of the light guide plate, it is able to reduce the space occupied by the light guide plate in the backlight module. Further, the arc reflection member has a flat surface where a planar backlight source is located, so it is able to facilitate the assembly of the planar backlight source with a circular light guide plate.

Of course, the novel light guide plate in the embodiments of the present disclosure may include, but be not limited to, any light guide plates in different forms and made of different materials using an identical or similar principle.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A light guide plate, comprising a light guide plate body having an upper surface as a light-exiting surface, wherein
the light guide plate is provided at a side portion at least one notch, and a light-reflection layer is arranged at a surface of each notch;
a wedge-shaped structure is arranged on a lower surface of the light guide plate body and adjacent to a bottom of each notch;
the wedge-shaped structure has a first surface attached onto the lower surface of the light guide plate body, a second surface serving as a light-entering surface, and a third surface intersecting the first surface and the second surface and having an acute angle relative to the first surface;
a light-reflection layer is arranged on the third surface;
a light source is arranged at a position on the lower surface of the light guide plate body adjacent to the second surface of the wedge-shaped structure; and
a light beam from the light source passes through the light-entering surface and reaches the third surface of the wedge-shaped structure and the notch, so that the light beam is reflected by the light-reflection layer at the third surface and the light-reflection layer at the notch toward the light guide plate body.

2. The light guide plate according to claim 1, wherein the notch is of an arc shape, and a surface of the notch is a cylindrical surface having a predetermined radian.

3. The light guide plate according to claim 2, wherein a tangential surface to the cylindrical surface is substantially parallel to the second surface of the wedge-shaped structure.

4. The light guide plate according to claim 1, wherein the third surface completely intersects an edge of the notch.

5. The light guide plate according to claim 4, wherein the third surface is defined by a curved side intersecting the edge of the notch, a straight side corresponding to the curved side, and two lateral sides intersecting the straight side and the curved side respectively, and wherein the two lateral sides and the straight side form two lateral sides and an upper base of an isosceles trapezoid.

6. The light guide plate according to claim 5, wherein the two lateral sides form an angle having a range of 0~120°.

7. The light guide plate according to claim 1, wherein the light-reflection layer at the surface of the notch is formed integrally with the light-reflection layer at the third surface.

8. The light guide plate according to claim 1, wherein the light guide plate body is formed integrally with the wedge-shaped structure.

9. The light guide plate according to claim 1, wherein the wedge-shaped structure has a height greater than or equal to the light source.

10. The light guide plate according to claim 1, wherein the light-exiting surface is of a circular or near-circular shape.

11. A backlight module, comprising a light guide plate, and a backlight source arranged on the light guide plate,
wherein the light guide plate comprises a light guide plate body having an upper surface as a light-exiting surface, wherein
the light guide plate is provided at a side portion at least one notch, and a light-reflection layer is arranged at a surface of each notch;
a wedge-shaped structure is arranged on a lower surface of the light guide plate body and adjacent to a bottom of each notch;
the wedge-shaped structure has a first surface attached onto the lower surface of the light guide plate body, a second surface serving as a light-entering surface, and a third surface intersecting the first surface and the second surface and having an acute angle relative to the first surface;
a light-reflection layer is arranged on the third surface;
a light source is arranged at a position on the lower surface of the light guide plate body adjacent to the second surface of the wedge-shaped structure; and
a light beam from the light source passes through the light-entering surface and reaches the third surface of the wedge-shaped structure and the notch, so that the light beam is reflected by the light-reflection layer at the third surface and the light-reflection layer at the notch toward the light guide plate body.

12. The backlight module according to claim 11, wherein the backlight source comprises a flat light-emitting surface attached onto the light-entering surface of the wedge-shaped structure.

13. A wearable device, comprising the backlight module according to claim 11.

14. The backlight module according to claim 11, wherein the notch is of an arc shape, and a surface of the notch is a cylindrical surface having a predetermined radian; and
wherein a tangential surface to the cylindrical surface is substantially parallel to the second surface of the wedge-shaped structure.

15. The backlight module according to claim 11, wherein the third surface completely intersects an edge of the notch.

16. The backlight module according to claim 15, wherein the third surface is defined by a curved side intersecting the edge of the notch, a straight side corresponding to the curved side, and two lateral sides intersecting the straight side and the curved side respectively, and wherein the two lateral sides and the straight side form two lateral sides and an upper base of an isosceles trapezoid.

17. The backlight module according to claim 16, wherein the two lateral sides form an angle having a range of 0~120°.

18. The backlight module according to claim 11, wherein the light-reflection layer at the surface of the notch is formed integrally with the light-reflection layer at the third surface.

19. The backlight module according to claim 11, wherein the light guide plate body is formed integrally with the wedge-shaped structure.

20. The backlight module according to claim 11, wherein the wedge-shaped structure has a height greater than or equal to the light source; and
wherein the light-exiting surface is of a circular or near-circular shape.

* * * * *